(12) United States Patent
Müller et al.

(10) Patent No.: US 7,650,753 B2
(45) Date of Patent: Jan. 26, 2010

(54) ARRANGEMENT FOR COOLING EXHAUST GAS AND CHARGE AIR

(75) Inventors: Rolf Müller, Ludwigsburg (DE); Eberhard Pantow, Möglingen (DE)

(73) Assignee: BEHR GmbH & Co. KG, Stuttgart (DE)

( * ) Notice: Subject to any disclaimer, the term of this patent is extended or adjusted under 35 U.S.C. 154(b) by 221 days.

(21) Appl. No.: 10/587,658

(22) PCT Filed: Feb. 1, 2005

(86) PCT No.: PCT/EP2005/000970

§ 371 (c)(1),
(2), (4) Date: May 31, 2007

(87) PCT Pub. No.: WO2005/073535

PCT Pub. Date: Aug. 11, 2005

(65) Prior Publication Data

US 2007/0277523 A1    Dec. 6, 2007

(30) Foreign Application Priority Data

Feb. 1, 2004    (DE) .................. 10 2004 005 057

(51) Int. Cl.
*F02B 29/04*     (2006.01)
*F02M 25/07*     (2006.01)
*F02B 33/00*     (2006.01)
*F01P 5/10*      (2006.01)

(52) U.S. Cl. .................. 60/599; 60/605.2; 123/563; 123/41.44; 123/41.31

(58) Field of Classification Search ............... 60/599, 60/605.2; 123/563, 41.44, 41.57, 41.21, 123/41.3, 41.31; F02B 29/04; F02M 25/07
See application file for complete search history.

(56) References Cited

U.S. PATENT DOCUMENTS

| | | | |
|---|---|---|---|
| 4,836,163 A * | 6/1989 | Muschalik | 137/630.15 |
| 5,529,025 A * | 6/1996 | Ranzinger et al. | 123/41.1 |
| 5,595,065 A * | 1/1997 | Boiarski et al. | 62/222 |
| 7,104,062 B2 * | 9/2006 | Amaral | 123/563 |
| 2005/0034712 A1 | 2/2005 | Guerrero | 123/540 |
| 2005/0229629 A1 * | 10/2005 | Burk et al. | 62/498 |
| 2006/0157002 A1 * | 7/2006 | Pfeffinger et al. | 123/41.44 |
| 2006/0236691 A1 * | 10/2006 | Raab et al. | 60/599 |
| 2006/0236987 A1 * | 10/2006 | Guerrero | 123/563 |
| 2008/0047267 A1 * | 2/2008 | Kardos et al. | 60/605.2 |
| 2008/0053090 A1 * | 3/2008 | Kardos et al. | 60/605.2 |
| 2008/0135028 A1 * | 6/2008 | Kardos et al. | 123/563 |
| 2008/0190109 A1 * | 8/2008 | Kardos et al. | 60/605.2 |

(Continued)

FOREIGN PATENT DOCUMENTS

EP    196 33 190 A1    2/1998

(Continued)

*Primary Examiner*—Thai Ba Trieu
(74) *Attorney, Agent, or Firm*—Foley & Lardner LLP

(57) ABSTRACT

The invention relates to an arrangement (A) for cooling recycled exhaust gas (AG) and charge air (LL) in a motor vehicle comprising a turbocharger respectively comprising at least one heat exchanger for the exhaust gas flow and a least one heat exchanger for the charge air flow. At least one heat exchanger for the exhaust gas flow and one heat exchanger for the charge air flow form part of a common low temperature cooling circuit (NK). The invention also relates to a method for operating one such arrangement (A).

16 Claims, 6 Drawing Sheets

U.S. PATENT DOCUMENTS

2008/0256949 A1 * 10/2008 Wikstrom et al. .......... 60/605.2
2008/0271451 A1 * 11/2008 Kardos et al. .............. 60/605.2
2009/0020079 A1 * 1/2009 Muller et al. ................ 123/563

FOREIGN PATENT DOCUMENTS

| EP | 1 059 432 A2 | 12/2000 |
| EP | 1 091 113 A2 | 4/2001 |
| EP | 1 170 498 A1 | 1/2002 |
| GB | 2 316 445 A | 2/1998 |
| WO | WO 99/15773 A1 | 4/1999 |
| WO | WO 03/069149 A1 | 8/2003 |
| WO | WO 2004/044402 A1 | 5/2004 |
| WO | WO 2004044401 A1 * | 5/2004 |

* cited by examiner

Prior art with direct charge air cooling

Prior art with indirect charge air cooling

ARRANGEMENT FOR COOLING EXHAUST GAS AND CHARGE AIR

BACKGROUND

The invention relates to an arrangement for cooling exhaust gas and charge air in a motor vehicle with a turbocharger and to a method of cooling exhaust gas and charge air.

According to the prior art, the power of engines is increased using turbochargers to compress the air. However, this involves heating the air, referred to hereinbelow as charge air, to temperatures of above 100° C. owing to the compression in the turbocharger. To reduce such air heating use is made of air coolers which are arranged at the front of the cooling module and serve for cooling the charge air. The charge air here flows through a heat exchanger, which is traversed by outside air and is thus cooled. This makes it possible to cool the charge air to a temperature which is about 15-50 K above the temperature of the outside air. Under part load, it is possible to cool this charge air to virtually the outside temperature, but the recirculated exhaust gas leaves the exhaust gas recirculation cooler at a temperature between 150 and 200° C. depending on the operating point. This results, particularly at high exhaust gas recirculation rates, in a relatively high mixing temperature in the intake pipe. The reason for this is that the recooling medium used for the exhaust gas cooler is the hot engine coolant, which means that it does not appear possible to cool the exhaust gas to below 100° C. even when the exhaust gas cooler has a very good degree of exchange.

DE 103 51 546 A1, which is a subsequent publication, proposes lowering the high temperature of the recirculated exhaust gas by using a further exhaust gas recirculation cooler which can be cooled with low temperature coolant or outside air and is connected downstream of the first exhaust gas cooler which is cooled with engine coolant. After mixing the exhaust gas and charge air, the temperature here cannot be sufficiently lowered as a result of the cooling of the recirculated exhaust gas stream provided by the engine oil, so that this has a disadvantageous impact on the emissions and the consumption of a diesel engine.

If an additional cooler for the exhaust gas stream is provided which is cooled with low temperature coolant or outside air, the production costs for the arrangement increase significantly.

If, after combining the exhaust gas and the charge air, the gas stream is passed over a cooler, the arrangement becomes more cost-effective, although in this variant the particles in the exhaust gas stream give rise to a pollution problem which, given the desired heat transfer capacity, is not settled.

FIG. 3 shows by way of example a prior art arrangement with direct charge air cooling and FIG. 4 shows by way of example a prior art arrangement with indirect charge air cooling.

SUMMARY

It is an object of the invention to improve an arrangement of the initially mentioned type such that, while minimizing production costs, optimum cooling of the gas mixture composed of recirculated exhaust gas and charge air is to be made possible.

According to the invention, an arrangement for cooling recirculated exhaust gas and charge air in a motor vehicle with a turbocharger, comprising at least one heat exchanger for the exhaust gas stream and one heat exchanger for the charge air stream, is provided, at least one heat exchanger for the exhaust gas stream and one heat exchanger for the charge air stream being part of a common low temperature coolant circuit.

The two heat exchangers are preferably connected in parallel in the low temperature coolant circuit, with the coolant being distributed as required, i.e. coolant will flow in particular through the exhaust gas cooler at low engine load/speed and in particular through the charge air cooler at high engine load/speed. In the case of maximum engine load/speed, coolant will preferably flow exclusively through the charge air cooler.

To circulate the coolant, a pump is arranged in the low temperature coolant circuit, this pump preferably being a switchable and, if appropriate, also a controllable pump.

The pump is preferably arranged upstream of the branch-off of the low temperature coolant circuit, with the result that both branches of the low temperature coolant circuit can be optimally supplied with coolant.

To control the coolant stream in the low temperature coolant circuit, a throttle member, preferably a throttle valve, is preferably arranged in one of the two parallel-connected regions of the low temperature coolant circuit. This member is preferably arranged at the coolant outlet in the section downstream of the charge air cooler, since the outlet temperature of the coolant leaving the charge air cooler is a function of the engine loading, which means that simple temperature-dependent control is possible, preferably via an expansion element.

BRIEF DESCRIPTION OF THE DRAWINGS

The invention will be explained in detail below by way of an exemplary embodiment, together with its variants, with reference to the drawing, in which.

DETAILED DESCRIPTION

An arrangement A for cooling exhaust gas AG and charge air LL in a motor vehicle with an (exhaust gas) turbocharger ATL comprises a main coolant circuit HK and a secondary coolant circuit NK, which will be disclosed in more detail at a later point.

Outside fresh air FL (indicated in FIG. 1 by an arrow) is sucked in and compressed by the turbocharger ATL, cooled in a charge air cooler LLK and fed to an engine M. Exhaust gas AG recirculated via an exhaust gas recirculation system AGR and cooled by means of an exhaust gas cooler AGK is fed to the engine M together with and as a mixture with the compressed, cooled charge air LL, this exhaust gas being, as required, branched off from the exhaust gas stream after leaving the engine M, recirculated and admixed with the charge air LL or removed (indicated by an arrow in FIG. 1).

The engine is cooled by means of a coolant which circulates in the main coolant circuit HK and which is circulated via a main water pump HWP. Depending on the temperature after flowing through the engine M, the coolant, controlled by a thermostat T, is conducted through a main coolant radiator HKK, which is air-cooled with the assistance of a fan L, or past this cooler through an engine bypass MB and back to the pump HWP.

The charge air LL and the exhaust gas AG are cooled by means of a coolant which circulates in the low temperature coolant circuit NK and which is circulated by a switchable auxiliary water pump ZWP. Provided shortly downstream of the pump ZWP is a branch-off, with one path leading via the exhaust gas cooler AGK and the second path leading via the charge air cooler LLK and via a subsequently arranged temperature-controlled throttle valve DV which serves for controlling the distribution of coolant. The two coolant streams are then recombined and flow through a low temperature coolant radiator NKK, which is arranged in parallel upstream of the main coolant radiator HKK as viewed in the direction of airflow, and once again reach the pump ZWP.

Figure 2:
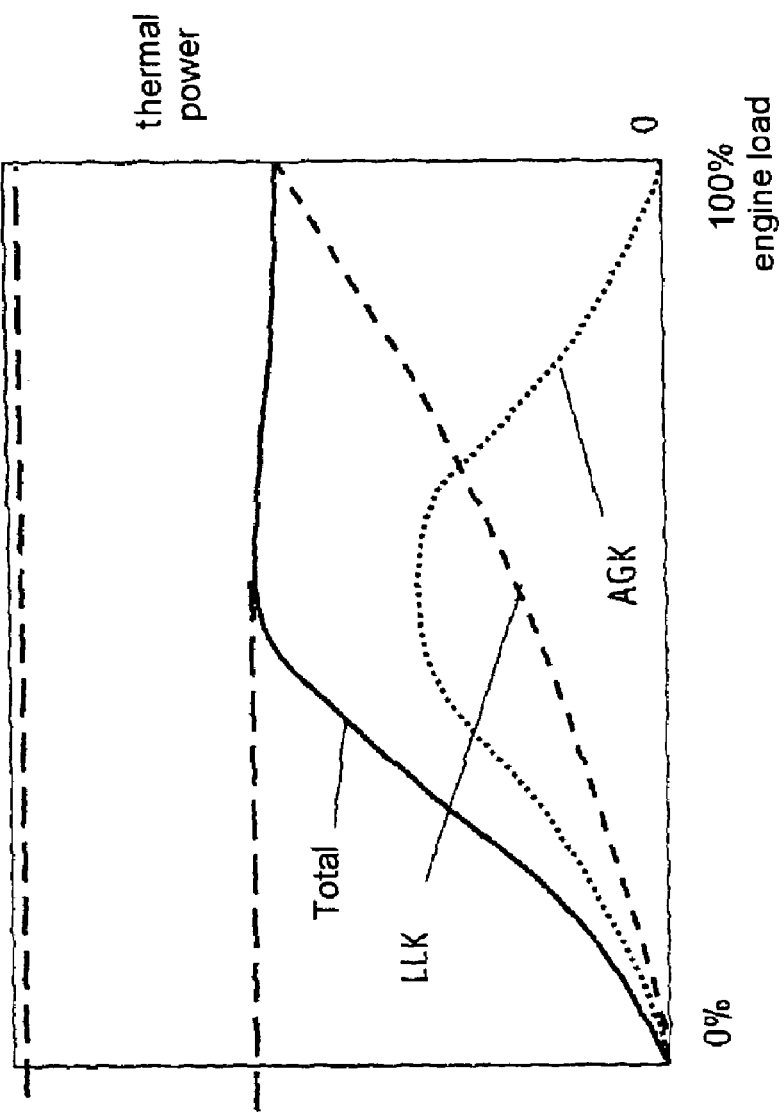
FIG. 2 shows a schematic representation of the profile of the quantity of heat to be removed in the charge air cooler and exhaust gas cooler over the engine load, the maximum cooling power in a conventional arrangement being compared with an arrangement according to the invention.
Figure 3:
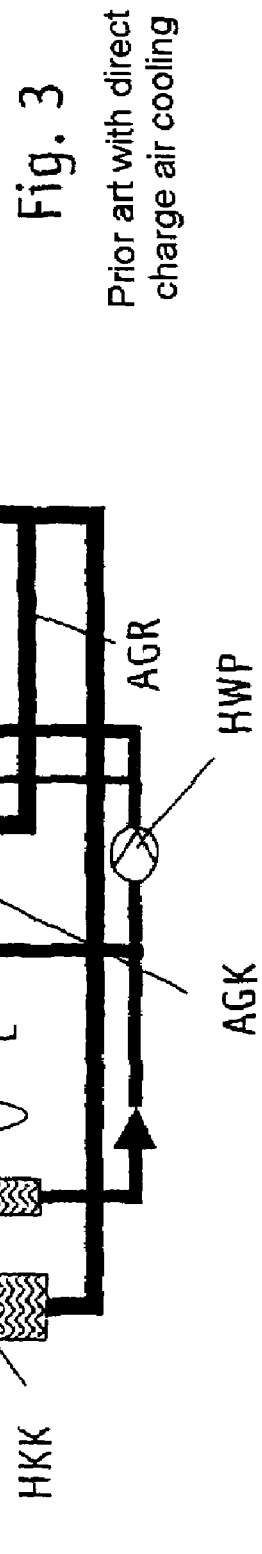
FIG. 3 shows an arrangement with direct charge air cooling according to the prior art.
Figure 4:
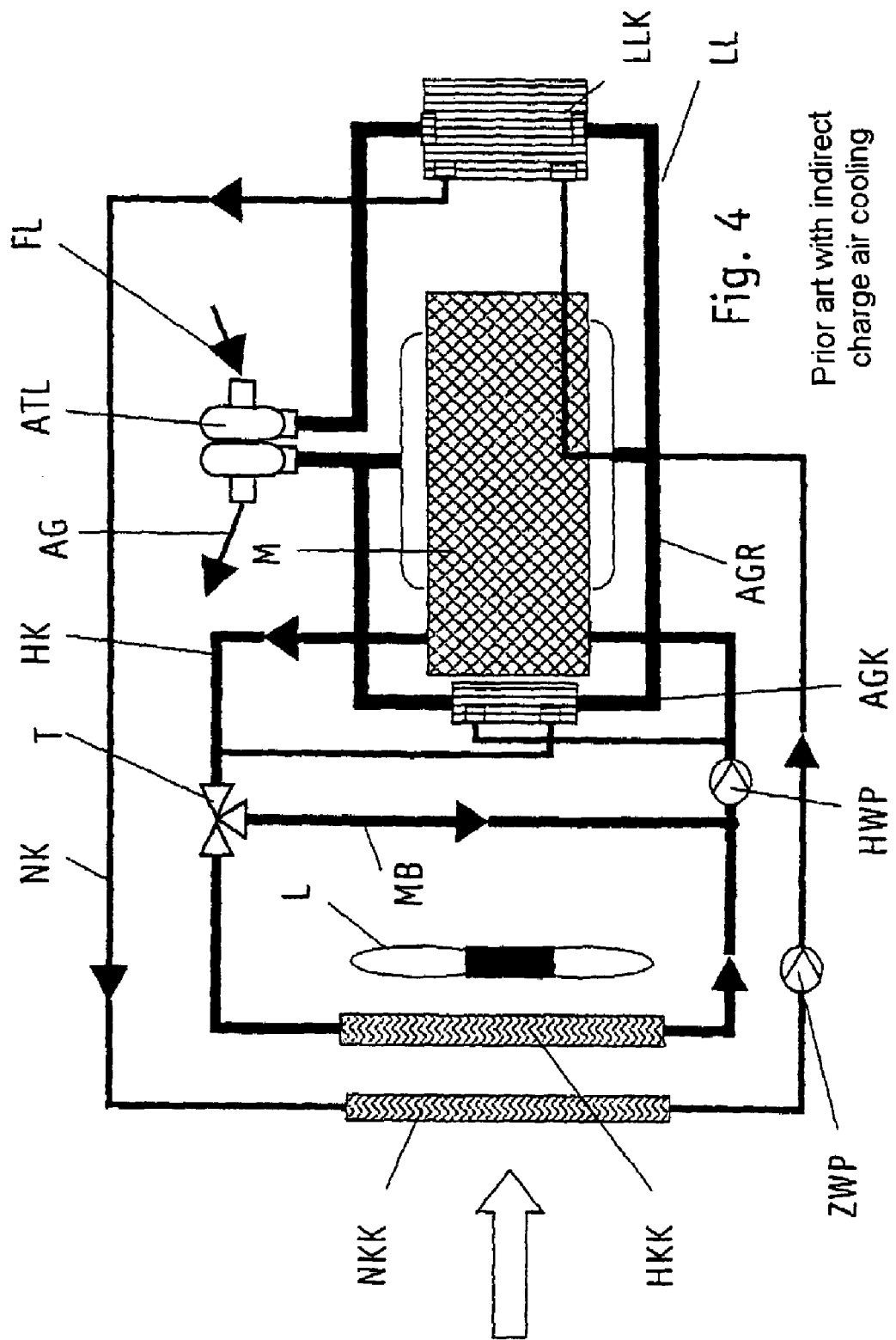
FIG. 4 shows an arrangement with indirect charge air cooling according to the prior art.

As can be seen from FIG. 2, the cooling requirement, i.e. the quantity of heat to be removed, increases in the charge air cooler LLK as the engine load increases, while the cooling requirement of the exhaust gas cooler AGK is at a maximum in the medium engine load range and drops back to about zero as the engine load increases further, resulting in an overall cooling requirement which constantly increases up to about 50% engine load and remains approximately at the maximum value.

Since the cooling temperature at the coolant outlet of the charge air cooler LLK is a function of the engine load, the throttle valve DV, in the present case an expansion element, makes it possible in a simple and cost-effective manner to achieve a substantially optimum distribution of the coolant stream between the two coolers AGK and LLK, which means that the coolant mainly flows through the exhaust gas cooler AGK at low to medium engine loads and speeds, whereas coolant mainly flows through the charge air cooler LLK in the full load range and at high speeds, and overall the temperature of the mixture composed of recirculated exhaust gas AG and charge air LL comes very close to the minimum which can be achieved.

According to an alternative embodiment, a throttle member is arranged in the exhaust gas recirculation system AGR or at another point of the charge air circulation system. Here, the coolant temperature at the outlet of the exhaust gas cooler AGK and of the charge air cooler LLK is respectively measured by means of a sensor, for example, and the throttle member is activated by means of a correspondingly defined logic device.

Furthermore, it is possible instead of the switchable auxiliary coolant pump ZKP provided according to the exemplary embodiment to provide a controllable auxiliary coolant pump. This allows the volumetric flow of the coolant to be adapted more precisely to the current requirement; however, the costs for a controllable pump and the corresponding control unit are in certain circumstances higher than the costs of a more simple pump.

As a third variant, it is also possible to arrange the heat exchangers in series in the low temperature coolant circuit; however, this requires preheating the coolant as it enters the second heat exchanger arranged downstream due to the thermal load of the first heat exchanger, which, by comparison with the parallel arrangement of the heat exchangers, leads in certain circumstances to an increased temperature of the gas mixture. In this case, a coolant bypass which can preferably be controlled via a throttle member may for example be provided on the first heat exchanger.

Within the context of the present invention, the exhaust gas recirculation may take place on the high pressure side or on the low pressure side of the charge air or exhaust gas circulation system, as respectively viewed from a turbocharger.

Figure 5:
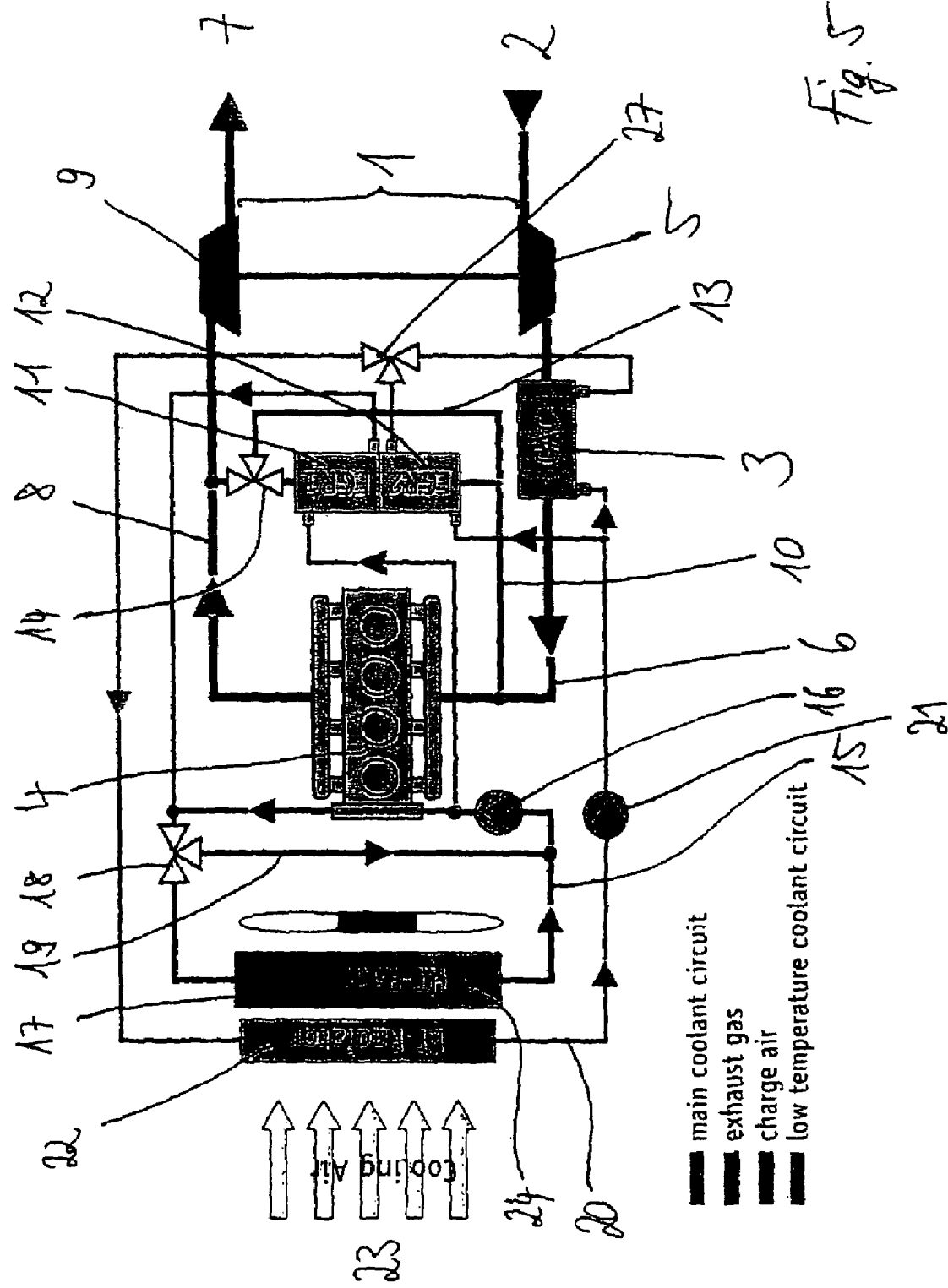
FIG. 5 shows an exemplary arrangement in which exhaust gas is recirculated on a high pressure side of an exhaust turbocharger.

FIG. 5 shows an exemplary embodiment of the present invention in which the exhaust gas is recirculated on the high pressure side of the exhaust gas turbocharger 1. Fresh air 2 is sucked in by the pump 5 of the exhaust gas turbocharger 1 and compressed. Heat which is generated in the process is passed to a charge air cooler 3, with the result that the charge air is fed in the cooled state to the engine 4 via the charge air line 6. The exhaust gas 7 of the engine 4 is removed from the engine 4 via an exhaust gas line 8 and drives a turbine 9 of the exhaust gas turbocharger 1.

At least in some operating states of the engine 4, a portion of the exhaust gas 7 is fed via an exhaust gas recirculation line 10 to the charge air in the charge air line 6. Two exhaust gas recirculation coolers 11, 12, which can be bypassed via a bypass line 13, are situated in the exhaust gas recirculation line 10 for the purpose of two-stage exhaust gas recirculation cooling. During a heating-up phase of the engine 4, for example, reduced cooling of the recirculated exhaust gas is desired, which means that in this case a valve 14, preferably in the form of a bypass valve, diverts the exhaust gas to be recirculated into the bypass channel 13. According to a preferred embodiment, the valve 14 is designed as a three-way valve and also controls the recirculated quantity of exhaust gas.

A main cooling circuit 15 for cooling the engine 4 is traversed by a coolant which is circulated by a main coolant pump 16 and is cooled by a main coolant radiator 17, the main coolant radiator 17 being able to be bypassed via a bypass line 19 by means of a valve 18, preferably designed as a thermostat.

A low temperature cooling circuit 20 for cooling the charge air cooler 3 is traversed by a coolant which is circulated by an auxiliary coolant pump 21 and is cooled by a low temperature coolant radiator 22, the low temperature cooler 22 and the main coolant radiator 17 being traversed successively by cooling air 23 which in turn is sucked in by a fan 24 in some operating states.

The first stage of the two-stage exhaust gas recirculation cooling is formed by the exhaust gas cooler 11, which is integrated into the main cooling circuit 15 parallel to the engine 4 and serves for transferring heat from the exhaust gas to be recirculated to the coolant in the main cooling circuit 15.

The second stage of the two-stage exhaust gas recirculation cooling is formed by the exhaust gas cooler 12, which is integrated into the low temperature cooling circuit 20 parallel to the charge air cooler 3 and serves for transferring heat from the exhaust gas to be recirculated to the coolant in the low temperature cooling circuit 20. More effective cooling of the exhaust gas to be recirculated is thus possible.

Figure 1:
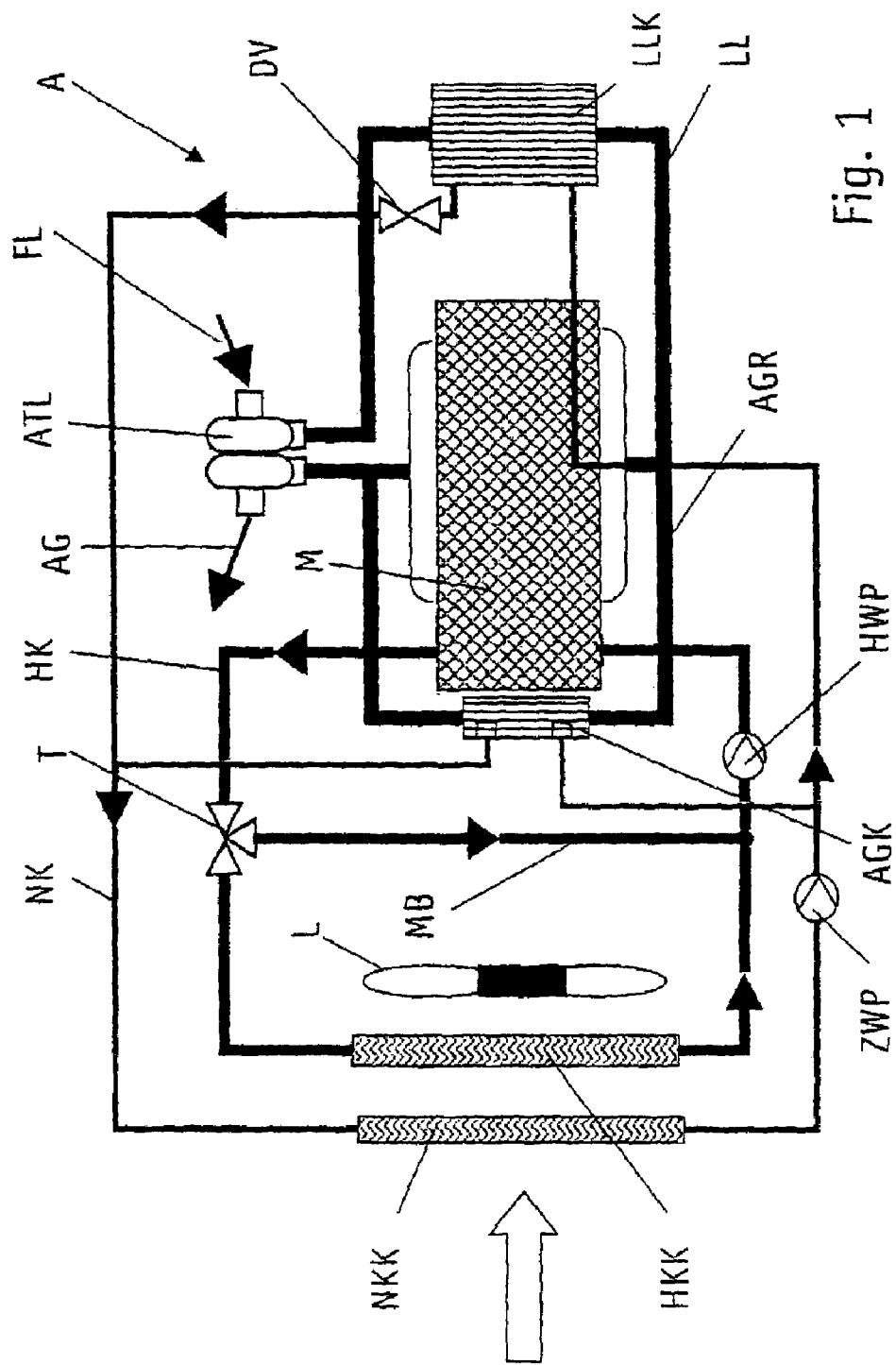
FIG. 1 shows a schematic representation of an arrangement according to the invention for cooling exhaust gas and charge air in a motor vehicle according to the exemplary embodiment.

In a similar way to what is shown in FIG. 1, a controllable throttle valve can be arranged downstream of the exhaust gas cooler 12 or downstream of the charge air cooler 3. In the exemplary embodiment shown, the throttle valve is designed as a three-way valve 27, which allows passage either only to coolant from the exhaust gas cooler 12 or only to coolant from the charge air cooler 3 or preferably steplessly regulates a quantitative proportion of the two coolant streams, for example as a function of the coolant temperature, in particular with the aid of an expansion element. In other exemplary embodiments, there is provided, instead or in addition, a fixed throttle downstream of at least one of the two heat exchangers, which throttle may in certain circumstances also be dispensed with if, for example, a pressure drop on the coolant side across the exhaust gas cooler 12 is in a predetermined ratio to a pressure drop on the coolant side across the charge air cooler 3. In this case, the aforementioned quantitative proportion is adjusted to an appropriate value.

Figure 6:
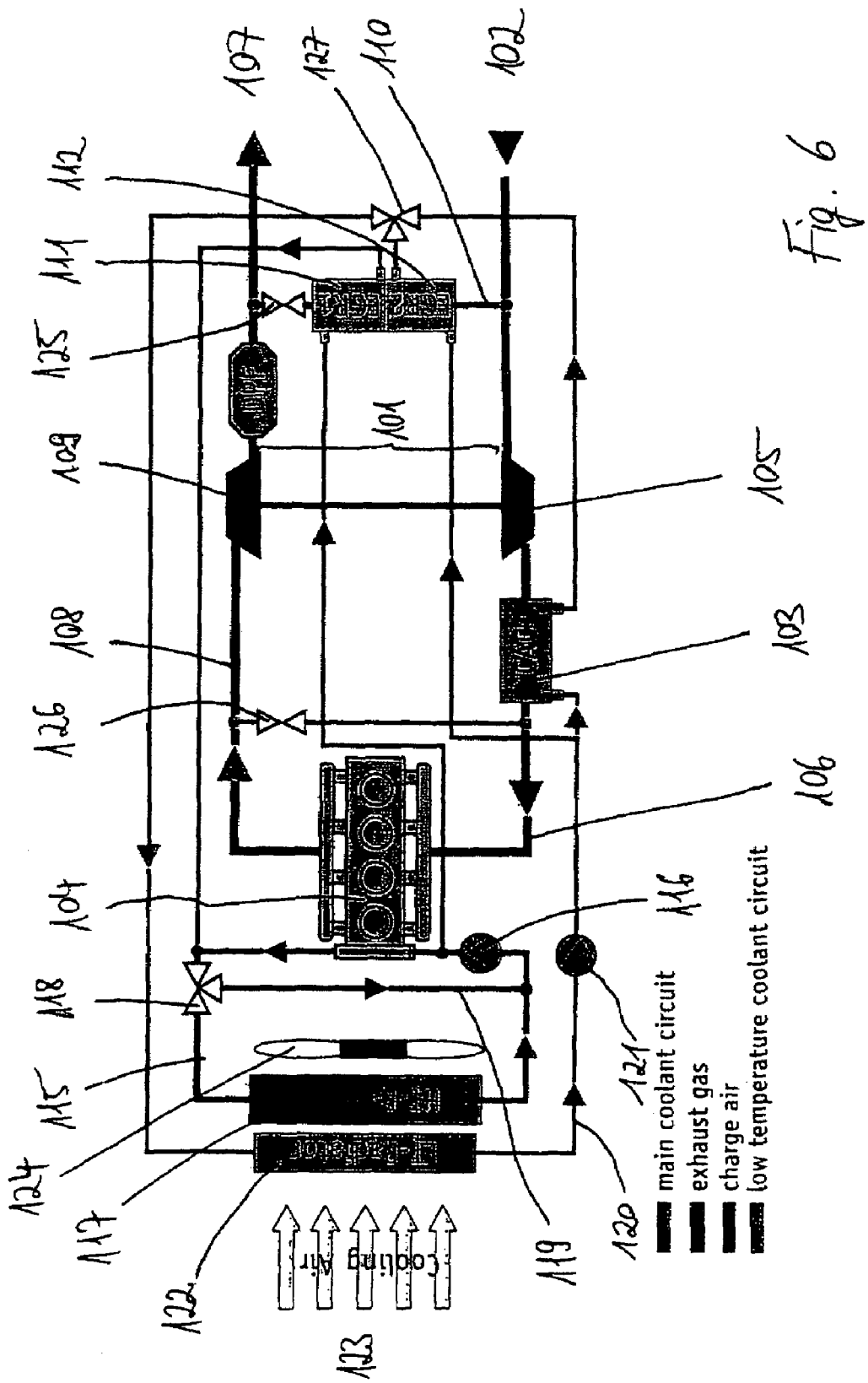
FIG. 6 shows an exemplary arrangement in which exhaust is recirculated on a low pressure side of an exhaust gas turbocharger.

FIG. 6 shows an exemplary embodiment of the present invention in which the exhaust gas is recirculated on the low pressure side of the exhaust gas turbocharger 101. At least in some operating states of an engine 104, fresh air 102 is mixed with recirculated exhaust gas and sucked in and compressed by the pump 105 of the exhaust gas turbocharger 101. Heat which is generated in the process is passed in a charge air cooler 103 to a coolant, with the result that the charge air in the cooled state is fed to the engine 104 via the charge air line 106. The exhaust gas 107 of the engine 104 is removed from the engine 104 via an exhaust gas line 108 and drives a turbine 109 of the exhaust gas turbocharger 101.

At least in some operating states of the engine 104, a portion of the exhaust gas 107 is, by means of an exhaust gas recirculation valve 125, admixed with the intake air 102 via an exhaust gas recirculation line 110. Two exhaust gas coolers 111, 112 are situated in the exhaust gas recirculation line 110 for the purpose of two-stage exhaust gas recirculation cooling. Provided on the high pressure side is a bypass line 113 via which, by means of a bypass valve 126, a portion of the exhaust gas can be fed to the charge air line 106 without specially provided cooling. During a heating-up phase of the engine 104, for example, reduced cooling of the recirculated exhaust gas is desired, which means that in this case the bypass valve 126 diverts the exhaust gas to be recirculated into the charge air line 106. The exhaust gas here is recirculated on the high pressure side, on which the exhaust gas temperature is higher than on the low pressure side, in order that as little heat as possible is lost in the relevant operating state of the engine 104.

A main cooling circuit 115 for cooling the engine 104 is traversed by a coolant which is circulated by a main coolant pump 116 and is cooled by a main coolant radiator 117, the main coolant radiator 117 being able to be bypassed via a bypass line 119 by means of a valve 118, preferably designed as a thermostat.

A low temperature cooling circuit 120 for cooling the charge air cooler 103 is traversed by a coolant which is circulated by an auxiliary coolant pump 121 and is cooled by a low temperature coolant radiator 122, the low temperature cooler 122 and the main coolant radiator 117 being traversed successively by cooling air 123 which in turn is sucked in by a fan 124 in some operating states.

The first stage of the two-stage exhaust gas recirculation cooling is formed by the exhaust gas cooler 111, which is integrated into the main cooling circuit 115 parallel to the engine 104 and serves for transferring heat from the exhaust gas to be recirculated to the coolant in the main cooling circuit 115.

The second stage of the two-stage exhaust gas recirculation cooling is formed by the exhaust gas cooler 112, which is integrated into the low temperature cooling circuit 120 parallel to the charge air cooler 103 and serves for transferring heat from exhaust gas to be recirculated to the coolant in the low temperature cooling circuit 120. More effective cooling of the exhaust gas to be recirculated is thus also possible here.

In a similar way to what is shown in FIG. 1, a controllable throttle valve can be arranged downstream of the exhaust gas cooler 112 or downstream of the charge air cooler 103. In the exemplary embodiment shown, the throttle valve is designed as a three-way valve 127 which allows passage either only to coolant from the exhaust gas cooler 112 or only to coolant from the charge air cooler 103 or preferably steplessly regulates a quantitative proportion of the two coolant streams, for example as a function of the coolant temperature, in particular with the aid of an expansion element. In other exemplary embodiments there is provided, instead or in addition, a fixed throttle downstream of at least one of the two heat exchangers, which throttle may in certain circumstances also be dispensed with if, for example, a pressure drop on the coolant side across the exhaust gas cooler 112 is in a predetermined ratio to a pressure drop on the coolant side across the charge air cooler 103. In this case, the aforementioned quantitative proportion is adjusted to an appropriate value.

LIST OF REFERENCES

A arrangement for cooling recirculated exhaust gas and charge air
AG exhaust gas
AGK exhaust gas cooler
AGR exhaust gas recirculation system
ATL exhaust gas turbocharger
DV throttle valve
FL fresh air
HK main coolant circuit
HKK main coolant radiator
HWP main water pump
L fan
LL charge air
LLK charge air cooler
M engine
MB engine bypass
NK low temperature coolant circuit
NKK low temperature coolant radiator
T thermostat
ZWP auxiliary coolant pump

The invention claimed is:

1. A method of cooling exhaust gas and charge air using an arrangement for cooling recirculated exhaust gas and charge air in a motor vehicle with a turbocharger having at least one heat exchanger for an exhaust gas stream, a charge air cooler for a charge air stream, and a throttle member for controlling the coolant stream in the low temperature coolant circuit, wherein the at least one heat exchanger for the exhaust gas stream and the charge air cooler are part of a common low temperature coolant circuit, and wherein the throttle member is configured to distribute the coolant stream between the at least one heat exchanger and the charge air cooler such that the coolant stream mainly flows through the at least one heat exchanger at low to medium engine loads and speeds and mainly flows through the charge air cooler at high engine loads and speeds, the method comprising:

using the same coolant of the low temperature coolant circuit to cool both the recirculated exhaust gas and the charge air.

2. The method as claimed in claim 1, wherein more than 50% of the coolant is fed to the exhaust gas cooler at low and medium engine loads and speeds.

3. The method as claimed in claim 1, wherein more than 50% of the coolant is fed to the charge air cooler at high engine loads and speeds.

4. The method as claimed in claim 3, wherein more than 50% of the coolant is fed to the charge air cooler in a full load range.

5. An arrangement for cooling recirculated exhaust gas and charge air in a motor vehicle with a turbocharger, comprising:
- at least one heat exchanger for an exhaust gas stream,
- a charge air cooler for a charge air stream, and
- a throttle member for controlling the coolant stream in the low temperature coolant circuit,
- wherein the at least one heat exchanger for the exhaust gas stream and the charge air cooler are part of a common low temperature coolant circuit,
- wherein the throttle member is configured to distribute the coolant stream between the at least one heat exchanger and the charge air cooler such that the coolant stream mainly flows through the at least one heat exchanger at low to medium engine loads and speeds and mainly flows through the charge air cooler at high engine loads and speeds.

6. The arrangement as claimed in claim 1, wherein the at least one heat exchanger and the charge air cooler are connected in parallel in the low temperature coolant circuit such that the low temperature coolant circuit has two parallel-connected regions.

7. The arrangement as claimed in claim 6, wherein the throttle member is arranged in one of the two parallel-connected regions of the low temperature coolant circuit.

8. The arrangement as claimed in claim 1, wherein a pump is arranged in the low temperature coolant circuit.

9. The arrangement as claimed in claim 8, wherein the pump is controllable or switchable.

10. The arrangement as claimed in claim 8, wherein the pump is arranged upstream of a branch-off of the low temperature coolant circuit.

11. The arrangement as claimed in claim 1, wherein part of the low temperature coolant circuit is an air-cooled low temperature coolant radiator.

12. The arrangement as claimed in claim 1, wherein the throttle member is a controllable throttle valve.

13. The arrangement as claimed in claim 1, wherein the throttle member comprises an expansion element.

14. The arrangement as claimed in claim 1, wherein the throttle member is arranged at a coolant outlet of the charge air cooler.

15. The arrangement as claimed in claim 1, further comprising a turbocharger, wherein the arrangement is configured such that the exhaust gas stream is recirculated on a high pressure side of the at least one heat exchanger.

16. The arrangement as claimed in claim 1, further comprising a turbocharger, wherein the arrangement is configured such that the exhaust gas stream is recirculated on a low pressure side of the at least one heat exchanger.

* * * * *